United States Patent [19]

Meyer et al.

[11] 4,435,989

[45] Mar. 13, 1984

[54] PLUNGER OPERATED PIPET

[75] Inventors: Richard C. Meyer, La Habra; Edward L. Carroll, Garden Grove, both of Calif.

[73] Assignee: Beckman Instruments, Inc., Fullerton, Calif.

[21] Appl. No.: 327,393

[22] Filed: Dec. 4, 1981

Related U.S. Application Data

[63] Continuation of Ser. No. 165,909, Jul. 3, 1980, abandoned.

[51] Int. Cl.[3] ........................ G01F 13/00; B01L 3/02

[52] U.S. Cl. .............................. 73/864.14; 73/864.18

[58] Field of Search ........... 73/864.13, 864.14, 864.17, 73/864.18

[56] References Cited

U.S. PATENT DOCUMENTS

| | | |
|---|---|---|
| 3,013,435 | 12/1961 | Rodrigues . |
| 3,091,124 | 5/1963 | Hindman . |
| 3,122,280 | 2/1964 | Goda . |
| 3,166,938 | 1/1965 | Weyrauch . |
| 3,248,950 | 5/1966 | Pursell et al. . |
| 3,261,509 | 7/1966 | Shevell . |
| 3,302,462 | 2/1967 | Pursell . |
| 3,343,539 | 9/1967 | Moorhouse . |
| 3,494,201 | 2/1970 | Roach . |
| 3,506,164 | 4/1970 | Weischelbaum . |
| 3,591,056 | 7/1971 | Griffin . |
| 3,606,086 | 9/1971 | Drummond . |
| 3,613,952 | 10/1971 | Gilmont . |
| 3,646,817 | 3/1972 | Hinchman . |
| 3,675,492 | 7/1972 | Tejera . |
| 3,741,732 | 6/1973 | Stanfield . |
| 3,757,585 | 9/1973 | Heller . |
| 3,760,639 | 9/1973 | Sokol . |
| 3,766,784 | 10/1973 | Walker . |
| 3,766,785 | 10/1973 | Smernoff . |
| 3,779,083 | 12/1973 | Ayres et al. . |
| 3,783,696 | 1/1974 | Coleman . |
| 3,786,683 | 1/1974 | Berman . |
| 3,805,998 | 4/1974 | Croslin . |
| 3,809,297 | 5/1974 | Poulten . |
| 3,810,391 | 5/1974 | Souvaniemi . |
| 3,815,790 | 6/1974 | Allen . |
| 3,827,305 | 8/1974 | Gilson . |
| 3,834,590 | 9/1974 | Robinson . |
| 3,853,012 | 12/1974 | Scordato . |
| 3,855,867 | 12/1974 | Roach . |
| 3,855,868 | 12/1974 | Sudvaniemi . |
| 3,882,729 | 5/1975 | Roach . |
| 3,905,232 | 9/1975 | Knute . |
| 3,918,308 | 11/1975 | Reed . |
| 3,933,048 | 1/1976 | Scordato . |
| 3,945,254 | 3/1976 | Rebold . |
| 3,952,599 | 4/1976 | Ayres . |
| 3,975,960 | 8/1976 | Groslin . |
| 3,991,617 | 11/1976 | D'Autry . |
| 4,009,611 | 3/1977 | Koffer . |
| 4,016,765 | 4/1977 | Lee . |
| 4,020,698 | 5/1977 | D'Autry . |
| 4,023,716 | 5/1977 | Shapiro . |
| 4,041,764 | 8/1977 | Sabloewski . |
| 4,054,062 | 10/1977 | Branham . |
| 4,058,370 | 11/1977 | Souvaniemi . |
| 4,072,247 | 2/1978 | Yamazaki . |
| 4,128,009 | 12/1978 | D'Autry . |

FOREIGN PATENT DOCUMENTS

| | | |
|---|---|---|
| 512405 | 5/1955 | Canada . |
| 914790 | 10/1954 | Fed. Rep. of Germany . |
| 1291142 | 3/1969 | Fed. Rep. of Germany . |
| 2202121 | 5/1973 | Fed. Rep. of Germany . |
| 2319175 | 10/1974 | Fed. Rep. of Germany . |
| 2456049 | 7/1976 | Fed. Rep. of Germany . |
| 2549477 | 5/1977 | Fed. Rep. of Germany . |
| 239388 | 9/1925 | United Kingdom . |
| 1439659 | 6/1976 | United Kingdom . |

OTHER PUBLICATIONS

Precision Pipetting System, Care and Procedure, a publication of Medical Laboratory Automation Inc., 7 pp.
Operating Instructions, Eppendorff Pipet, 6 pp.
Oxford P–7000 Sampler Micropipetting System, 4 pp.
Automatic Pipet–Kimble Products, 2 pp.
Advertisement for Pipette–Rainin Instrument Co., 1 p.

*Primary Examiner*—S. Clement Swisher
*Attorney, Agent, or Firm*—R. J. Steinmeyer; R. R. Meads; S. R. Markl

[57] ABSTRACT

Plunger operated pipet operable to execute different lengths of plunger movement during successive fluid pickup and fluid discharge operations or strokes. A stop member is movable between first and second locations in the pipet body to halt plunger movement at two different positions. A drive spring for driving the stop member from one location to the other is energized by a manually operable arming element and is retained in one location against action of the drive spring during a first plunger stroke. A release mechanism responsive to plunger movement during the first stroke disables the retaining means allowing the drive spring to move the stop member to the second location at which position the plunger is halted during the succeeding discharge stroke. The arming element is actuated by and in response to positioning of a replaceable tip on the pipet body. The arming element exerts a force on the tip sufficient to expel the tip from the body unless the tip is properly seated on the body thus ensuring that the pipet is armed if the tip is properly seated. A signalling system is provided which signals the occurrence of the second or fluid dispensing stroke of plunger movement.

2 Claims, 19 Drawing Figures

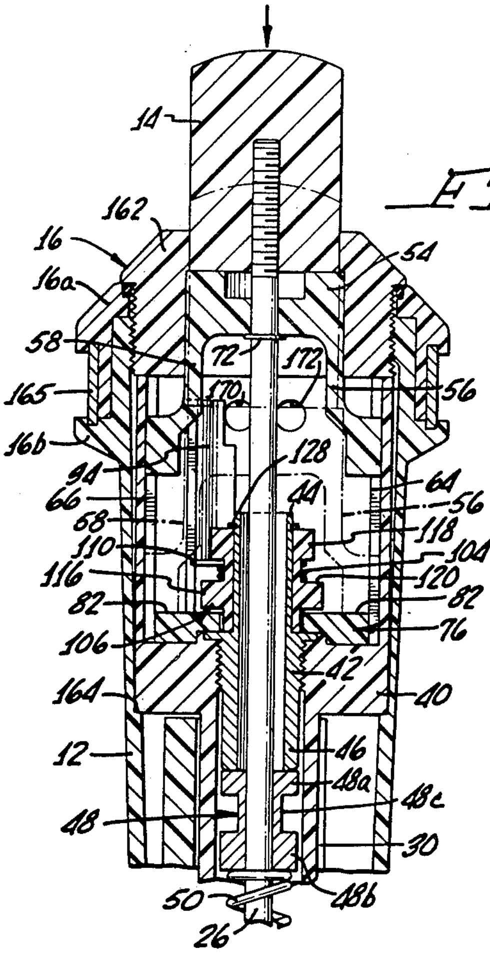
FIG. 14.
FIG. 16.
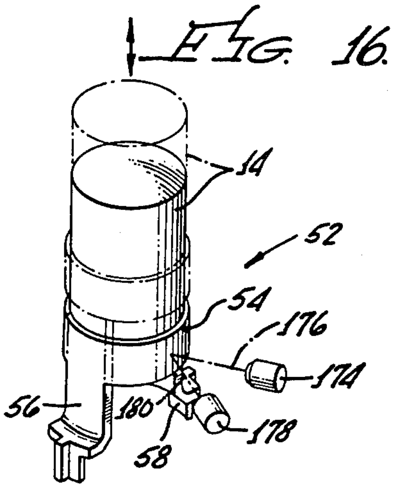
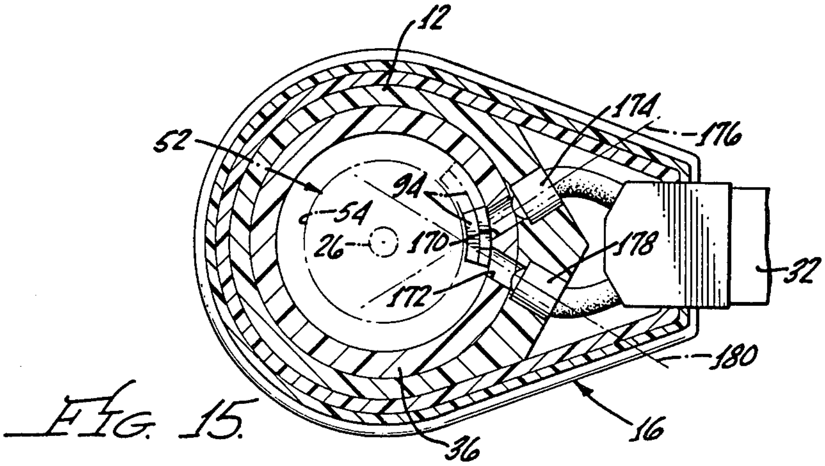
FIG. 15.

PLUNGER OPERATED PIPETsp

This is a continuation of application Ser. No. 165,909, filed July 3, 1980, now abandoned.

CROSS-REFERENCE TO RELATED APPLICATION

This application is related to the application filed concurrently herewith titled "Plunger Operated Pipet" Ser. No. 456,201 filed Jan. 7, 1983 which is a continuation of Ser. No. 351,568 filed Feb. 23, 1982, now abandoned.

BACKGROUND OF THE INVENTION

1. Field of the Invention

The present invention relates to plunger operated pipets for picking up and dispensing predetermined volumes of fluid and, more particularly, to pipetes incorporating mechanisms for controlling the extent of plunger movement during successive fluid pickup and dispensing operations.

2. Description of the Prior Art

Pipets are widely used in laboratory and clinical procedures which require a predetermined fluid volume to be aspirated from one vessel and the same or a different fluid volume to be dispensed into another vessel. Such pipets typically include a plunger or piston which is actuated in one direction to aspirate or draw fluid into an open end of the pipet and in the opposite direction to discharge fluid from the open end. In a common form, such pipets are sized to fit in an operator's hand and include a plunger actuator controllled by the operator's thumb or finger to drive the plunger in one direction and a return spring to drive the plunger in the opposite direction. The operator depresses the plunger actuator to drive the plunger forwardly against the spring force and expel air from the open end. The open end then is immersed in fluid and the plunger retracted rearwardly by the spring drawing fluid into the open end. Next, the pipet is positioned over or in a receiving vessel, and the plunger is again driven forwardly to expel fluid from the pipet into the vessel. The pipet is withdrawn from the vessel and the plunger retracted rearwardly to prepare for the next pickup operation. Usual pipet action thus comprises two successive plunger strokes—a fluid pickup stroke followed by a fluid dispensing stroke—each stroke comprising plunger movement in foward and rearward directions. In some laboratory procedures, the pipet tip is immersed in fluid (e.g. reagent) in the receiving vessel, and the fluid dispensing stroke comprises repeated actuation of the plunger back and forth to thoroughly mix the reagent and the dispensed fluid by the turbulent intake and discharge of both.

Fluid contamination of the operating pipet elements is typically avoided by means of a replaceable, conical plastic tip fitted on and sealed around the open end of the pipet. The available interior volume of the tip is larger than the fluid pickup capacity of the pipet. As a result, plunger actuation draws fluid only into the tip and thereafter dispenses the fluid from the tip. After the dispensing stroke, the operator removes and disposes of the tip and replaces it with a new tip. As a result the pipeted fluid does not contact and hence cannot contaminate other elements of the pipet. Moreover, no fluid remains to contact and thus contaminate the next fluid sample picked up.

In some laboratory procedures it is desired that the pipet plunger be capable of executing different length strokes of plunger movement in succession. For example, often a relatively short pickup stroke is to be followed by a longer discharge stroke. In this manner the total volume of fluid picked up is discharged from the pipet followed by a small slug or volume of air. The scrubbing action of the air slug as it leaves the tip helps to expel any residue of fluid which might otherwise cling to the tip. When minute microliter sample volumes are being dispensed, any fluid residue which remains on the pipet tip, even as little as one drop, can represent a significant fraction of the dispensed fluid volume and hence can lead to large measurement errors in the laboratory procedures or analyses being performed. The longer dispensing stroke helps to avoid such errors.

On the other hand, in other procedures it is desired to pick up with a long stroke and dispense with a shorter stroke so that some of the fluid picked up remains in the tip after dispensing is complete. For example when pipetting fluid into a nephelometric analysis cell which measures the extent to which light is scattered by the cell contents, wide fluctuations and hence corresponding errors in measured light scatter are caused by air bubbles present in the cell. By dispensing fluid into the nephelometric cell using a shorter plunger stroke some fluid will remain in the pipet tip at the conclusion of the dispensing stroke and, therefore, no interferring air bubbles will be discharged from the pipet into the nephelometric cell.

U.S. Pat. Nos. 3,506,164 and 3,766,784 illustrate prior pipet arrangements for executing successive plunger pickup and dispensing strokes of different lengths. Each patent illustrates an internal indexing mechanism responsive to forward and rearward plunger movement causing the pipet plunger to execute an alternating stroke sequence of long-short-long-short-long . . . , etc., ad infinitum. That is, plunger actuation always causes the plunger stroke length to alternate back and forth between two different stroke lengths so that each plunger stroke is always different in length than the preceding one.

While the aforementioned patented devices are often used in the above-described pipetting operations, they exhibit a number of operational drawbacks which reduce their overall attractiveness. A first drawback is that an operator upon observing or holding the pipet cannot be certain whether the next stroke will be long or short. As a result, to be certain, the operator must depress the plunger actuator one or more times, observe the alternating plunger stroke sequence, and terminate the plunger action after a short stroke if long pickup stroke is desired or vice versa—all simply to ensure that the stroke will be either long or short as desired. Unless the operator accurately checks the stroke length sequence before each pipet operation, it is possible that the wrong sequence will be executed thereby causing a major error in the volume of fluid dispensed and measured. A second drawback of the aforementioned devices results from the fact that the indexing mechanism for executing the alternating stroke length sequence receives and operates in response to the axially directed actuating force applied to the plunger by the operator. As a result, the operating indexing elements of the pipets are subject to force loading causing the elements to wear and hence increasing the likelihood of premature part failure. Moreover, they are subject to excessive force loading from operator misuse or abuse increasing the probability of jamming or other malfunctioning of the operating elements.

As a result, there is a need for a pipet plunger stroke length control mechanism which does not require operator attention to check the stroke sequence and which is less susceptible to jamming or other mechanical failure.

SUMMARY OF THE INVENTION

The present invention resides in new and improved pipetting apparatus which overcomes the drawbacks of the prior pipets in executing successive plunger strokes of different lengths. The improved pipetting apparatus is achieved in a commercially practical form which is simple and inexpensive in construction and reliable in operation.

To the foregoing ends, the present invention is embodied in pipetting apparatus of the type having a generally tubular body with an open forward end for receiving and expelling fluid and a plunger supported for axial movement in the body to draw fluid into and expel fluid from the body with axial movement away from and toward the open end, together with stop means movable between first and second locations in the body to halt movement of the plunger in one direction at first and second axial stop positions thereby establishing different stroke lengths of plunger movement in the body. The invention includes drive spring means for driving the stop means in one direction between the first and second locations, arming means for energizing the spring means, and means for retaining the stop means in one of the first and second locations against action of the drive spring means. Release means is provided responsive to plunger movement away from the forward end during a first plunger stroke following energizing of the spring means for disabling the retaining means and allowing the spring means to drive the stop means to the other of the first and second locations thereby conditioning the pipet to execute the succeeding or second plunger stroke of different length than the first. With the foregoing arrangement the the spring means is energized by the arming means conditioning the spring means to drive the stop means from the first location the second location. The retaining means ensures that the stop means is retained in the first location against action of the spring means to establish the stroke length of the first plunger stroke with certainty. Significantly, the release means responds to plunger movement away from the forward end of the body to disable the retaining means and allow the spring means to drive the stop means to the second location, establishing the second stop position of the second plunger stroke, only after plunger movement to the first stop position has been executed during the first stroke. The second stroke is then executed with equal certainty that it will be the second of the two different stroke lengths.

In one form, the stop means comprises a stop member coaxial with the plunger and circumferentially rotatable with respect thereto between the first and second locations to align a first or a second different stop surface at the first and second axial positions for engaging an abutting plunger surface and thereby halting plunger movement at the first or the second axial position. In a preferred form, the first and second stop surfaces are each disposed on a rotatable stop element and the abutting plunger surfaces are provided on a plunger follower element which moves axially with the plunger.

In one form, the arming means includes a manually operable arming element supported for movement between an unarmed position and an armed position. The arming element is cooperatively coupled to the stop member by the drive spring means and may be similarly disposed coaxial with the plunger for circumferential rotation thereabout and for relative rotation with respect to the stop member for energizing the drive spring means. With such an arrangement, arming is achieved by moving or rotating the arming element to the armed position, with the stop member retained against rotation by the retaining means, thereby energizing the drive spring means. The retaining means is released only by plunger movement away from the forward end during the first plunger stroke. At such time, the stop member is then rotated to its second location in preparation for the second stroke by the action of the drive spring means. As a result of the foregoing configuration, movement of the stop member between first and second stop positions is by the driving force of the drive spring means, not axial movement of the plunger, thereby avoiding axial loading of the stroke length control elements.

In accordance with a primary aspect of the invention, the arming means functions to energize the spring means in response to an operator positioning a tip member on the open end of the body. To this end, the arming means includes an arming element supported for movement between an unarmed position and an armed position in combination with return spring means biasing the element toward the unarmed position in which position the arming element obstructs positioning of the tip on the body. Insertion of the tip onto the body drives the arming element against the force of the return spring to the armed position and if the tip is properly seated, it will retain the arming element in the armed position. In accordance with a further aspect of the invention, the spring force on the arming element is in a direction and is of sufficient strength to expel the tip from the body if the tip is not properly and securely seated on the body. In this manner the pipetting apparatus is armed to execute the desired stroke sequence only if the tip is properly installed on the pipet body. Such provides a built-in fail-safe mechanism ensuring an operator that if the tip is installed, the desired long-short or short-long stroke sequence is set with certainty.

BRIEF DESCRIPTION OF THE DRAWINGS

FIG. 14 is a view similar to FIG. 10 but illustrating in phantom outline the position of the plunger follower engaging the rearwardmost stop surface of the stop member after rotation of the stop member to the released position of FIG. 13.

FIG. 15 is a cross-sectional view taken along line 15—15 of FIG. 11 illustrating an optical signalling system responsive to plunger movement to signal the discharge of fluid from the pipet.

FIG. 16 is a perspective diagrammatic view of the plunger follower in an axial position intercepting the optical axes of the FIG. 15 signalling system. FIG. 16 further depicts positioning of an extension of the stop member which disables the signalling system during a pickup stroke.

DESCRIPTION OF THE PREFERRED EMBODIMENTS

Figures 1, 2, 17A, 17B:
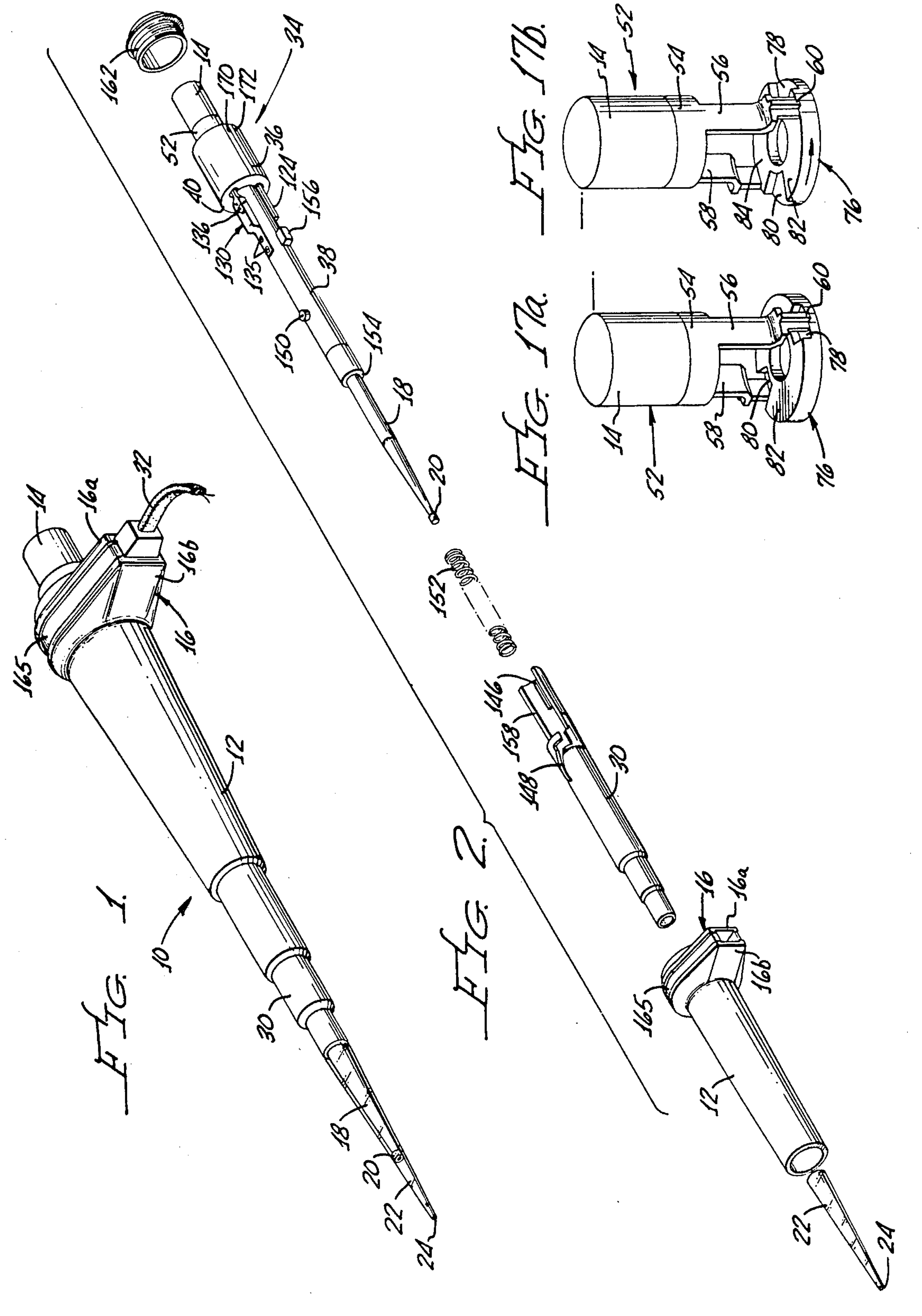
FIG. 1 is a perspective view of a pipet in accordance with the present invention.
FIG. 2 is an axially exploded, perspective view of the FIG. 1 pipet partially disassembled to depict the pipet inner body and the operating elements which are assembled onto and supported externally of the inner body.
FIGS. 17*a* and 17*b* are perspective diagrammatic views depicting, respectively, rotational alignment of the stop member with respect to the plunger follower in the first and second locations to stop forward movement of the plunger follower in respective long stroke and short stroke limit positions.

As shown in the drawings for purposes of illustration, and particularly FIG. 1 thereof, the present invention is embodied in pipetting apparatus 10 including an outer housing 12 adapted to be comfortably and securely held in the hand of an operator and to this end being illustrated as having a generally conically tapering configuration. An actuator 14 is disposed at the axially rearward end of the pipet to be engaged and driven in an axial direction by an operator's thumb or finger to control pipet operation. The rearward end of housing 12 includes an enlarged head 16 projecting outwardly therefrom. The head typically is gripped between an operator's forefinger and middle finger to steady the pipet in the operator's hand. The head also prevents the pipet from rolling when placed on a laboratory bench or other flat surface.

The forward end of pipet 10 comprises a nozzle 18 terminating in an open forward end 20 communicating with the interior of the pipet. A generally conical, disposable plastic tip 22 is partially telescoped over nozzle 18 in an air-tight sealed relationship around open end 20 of the nozzle. An opening 24 in the forward end of the disposable tip 22 communicates with the opening 20 of the nozzle. With the tip installed as illustrated in FIG. 1, movement of actuator 14 causes fluid to be drawn into and expelled from the disposable tip 22 through opening 24 therein. The volume of fluid drawn in is less than the available interior volume of the tip 22. As a result the fluid is confined solely to the tip and does not contact and hence cannot contaminate nozzle 18 nor any other operating elements of the pipet. After each pipetting operation the operator removes the contaminated tip 22 and replaces it with a new tip.

Aspiration of fluid into or dispensing of fluid from the open end of the pipet 10 is effected in a conventional manner by an axially disposed and movable plunger or piston 26 (FIG. 3) which is secured to and movable with actuator 14. A reduced diameter forward end 28 of the plunger is slidingly, snugly, and coaxially received in an air-tight sealed relationship within an internal axis bore (not shown) of nozzle 18 communicating with the open nozzle end 20. Axial movement of the plunger forward and rearward through the internal bore causes the respective expulsion and drawing in of fluid (e.g. air) through the opening 20 of nozzle 18 and hence causes corresponding expulsion and drawing in of fluid (e.g. liquid and/or air) through the opening 24 of tip 22. The plunger stroke length, that is the axial distance of plunger movement, establishes the volume of fluid drawn in and the volume of fluid discharged by the pipet.

A major feature of pipet 10 resides in an arrangement of elements by which the operator establishes a predetermined sequence of different plunger stroke lengths. The cooperating plunger stroke length control elements, most internal to the pipet 10, will be developed below in the discussion of the more detailed figures. First, however, to identify the remaining elements illustrated in FIG. 1, operator control of the plunger stroke sequence is effected in one embodiment by means of an arming mechanism which includes an arming sleeve 30 supported for movement axially and rotationally along the pipet and having a forward end abutting the rearward conical base of disposable tip 22 and a rearward end received coaxially within upper housing 12. A further feature of the pipet 10 resides in an arrangement of elements, again internal to the pipet, for monitoring the movement of the plunger 26 and for signalling the expulsion of fluid from the pipet. Electrical connection between the signalling system and other system components is provided by a cable assembly 32 extending from the head 16 of the upper pipet housing 12.

Figures 3, 4, 5:
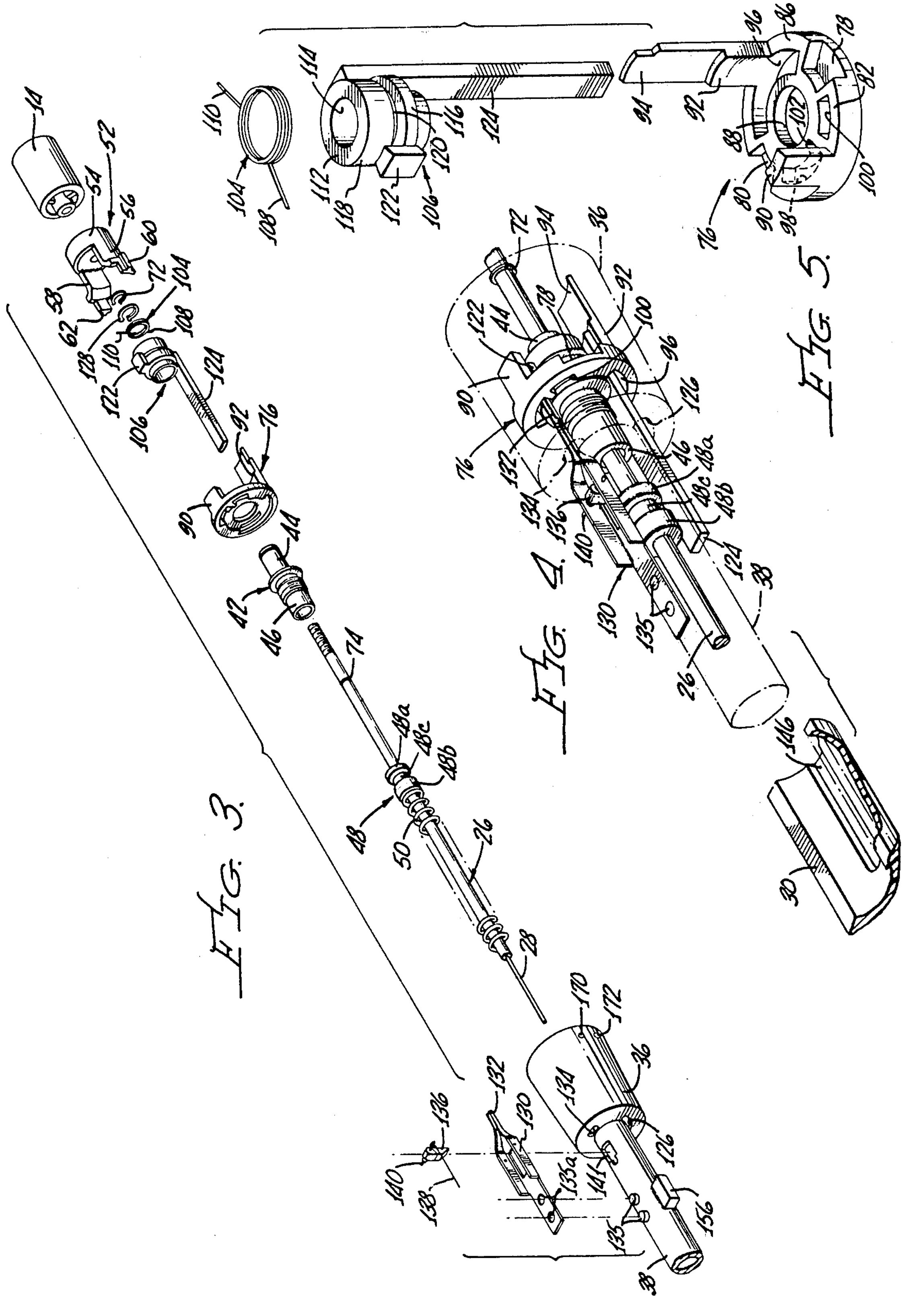
FIG. 3 is an axially exploded, partial perspective view of the inner body of FIG. 2 disassembled to depict the operating elements which are assembled into and supported within the inner body.
FIG. 4 is a partial fragmentary perspective view of internal operating elements as assembled at the axially rearward end of the pipet which cooperate to establish a predetermined plunger stroke length sequence and further illustrates operative connection of the arming means with the stroke length control elements.
FIG. 5 is an exploded perspective view of the cooperating stroke length control elements of FIG. 4 including arming element, drive spring, and stop member.
Figure 10:
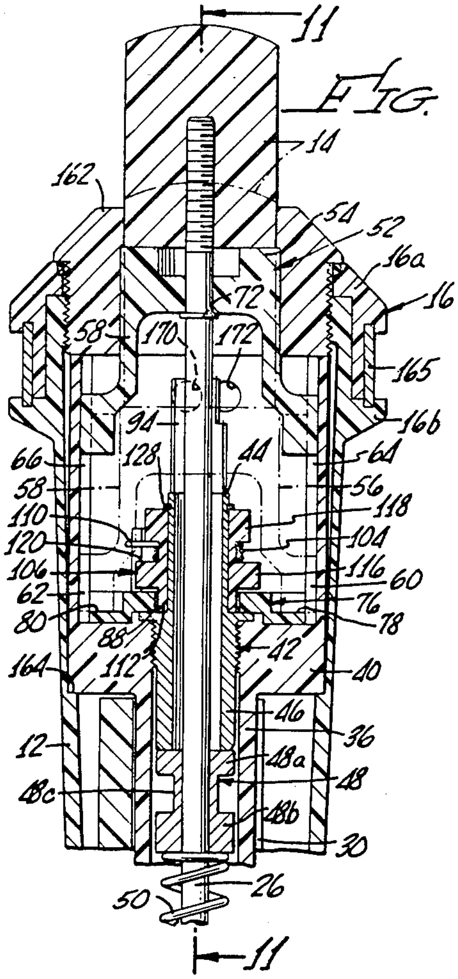
FIG. 10 is an axially extending cross-sectional view taken along line 10—10 of FIG. 9 depicting internal plunger stroke length control elements at the rearward end of the pipet and illustrating, in phantom outline, the axial position of the plunger follower element engaging the axially forwardmost stop surfaces of the stop member.
Figure 11:
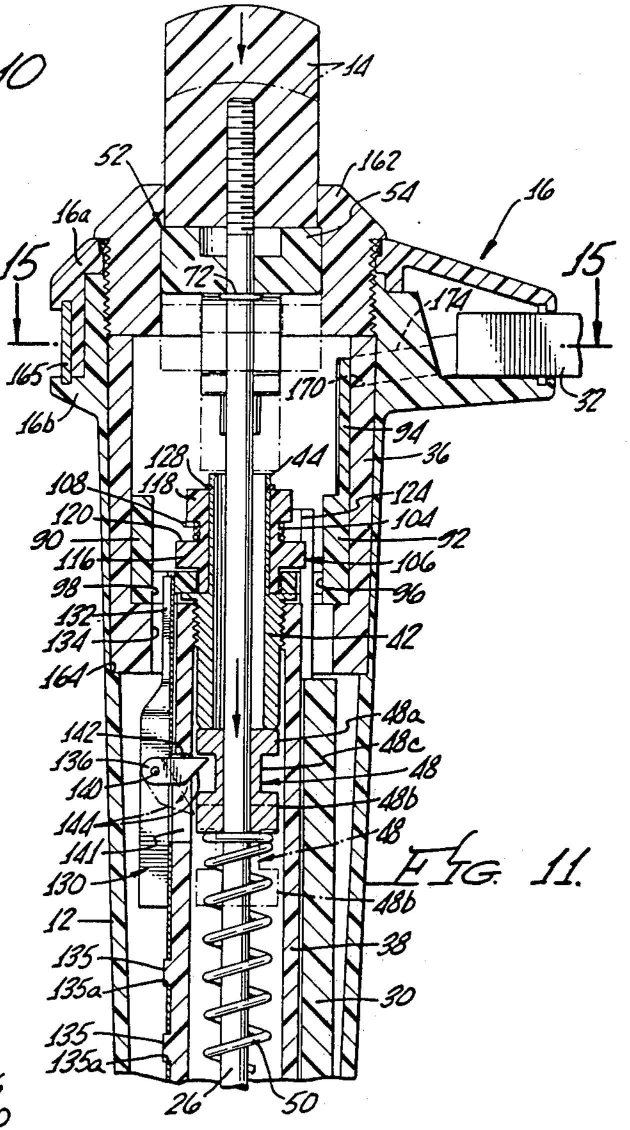
FIG. 11 is a cross-sectional view taken along line 11—11 of FIG. 10 illustrating the plunger prior to forward movement with the pivoted retaining member in position retaining the stop member against rotational motion against action of the drive spring. The figure further illustrates in phantom outline slight forward axial movement of the plunger in a manner rotating the release pawl to a position allowing unimpeded forward axial movement of the plunger past the pawl.
Figure 12:
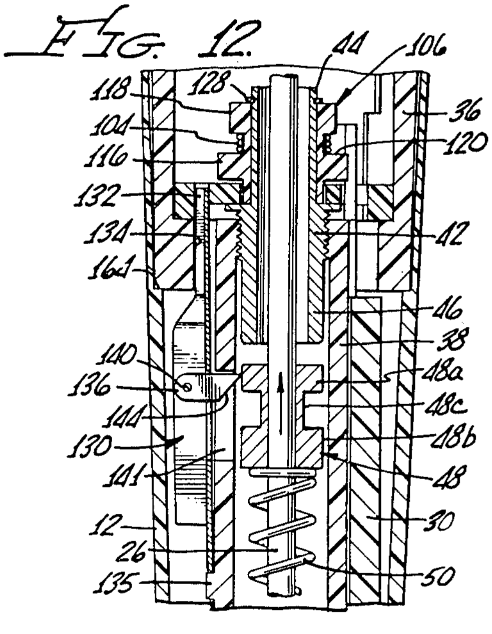
FIG. 12 is a view similar to the lower portion of FIG. 11 illustrating the position of the plunger during rearward axial movement away from the forward end after having engaged the camming surface of the release pawl to cam the pivoted retaining member laterally outward to release the stop member, allowing the stop member to move to its second location under the action of the drive spring means.

Referring now to the exploded perspective views of FIGS. 2-3 and the axially extending sectional views of FIGS. 10-12, the pipet 10 includes a generally tubular inner pipet body 34 (FIG. 2) within which plunger 26 is supported for axial movement. Plunger 26 is axially disposed within body 34 with its rearward or upper end threaded into and hence secured to actuator 14, as illustrated in FIG. 10.

As illustrated in FIG. 2, the inner pipet body 34 includes a first or rearward tubular section 36 and a second or intermediate tubular section 38 extending forwardly from the first section and reduced in diameter compared to the first. Nozzle 18 is secured to the forward end of intermediate tubular section 38 by a threaded coupling (not shown) therebetween. Outer housing 12 of the pipet is assembled around pipet body 34, as illustrated in FIG. 10, and is held thereon by an exteriorly threaded ring 162 threaded into the rearward end of the housing. The ring abuts the rearward annular face of tubular section 36 to prevent axially forward movement of the housing. An interior annular shoulder 164 of the housing abuts the forward face of section 36 to prevent axially rearward movement of the housing. Ring 162 also retains in place a rearward section 16*a* of head 16. As thus retained, head section 16*a* cooperates with a forward section head 16*b* to retain a lettered or otherwise inscribed identification band 165 which extends circumferentially around head 16.

Tubular sections 36 and 38 of the inner pipet body 34 are joined by a generally annular wall 40 (FIG. 10) which forms the base or floor of tubular section 36. A tubular post member 42 is axially threaded into wall 40 to a fixed axial position. Post member 42 includes a first tubular support post 44 which extends rearwardly and coaxially within pipet rear body section 36 and a second tubular post or stop 46 extending forwardly and coaxially into the intermediate pipet body section 38.

As depicted in FIG. 10, the rearward limit of travel of plunger 26 away from the open end of the pipet is established by tubular stop 46 in cooperation with a spool-shaped plunger shoulder 48 integral with or rigidly affixed to plunger 26. Plunger shoulder 48 coaxially surrounds the plunger and includes axially spaced, large diameter annular end sections 48*a* and 48*b* joined by an intermediate reduced diameter annular section 48*c*. The end sections are slightly smaller in diameter than the interior bore of the intermediate pipet body section 38 in order not to impede axial movement of the plunger within the bore. As indicated, rearward movement of plunger 26 is limited or stopped in the position, illustrated in FIG. 10, at which position plunger shoulder 48*a* engages and abuts tubular stop 46 of axially fixed post member 42.

A plunger return spring 50 (FIGS. 3, 10) is provided to apply a rearward biasing force to plunger 26 for moving the plunger in the rearward direction away from the open end of the pipet and for retaining the plunger in the rearward limit or stop position of FIG. 10. Return spring 50 coaxially surrounds plunger 26 forwardly of plunger shoulder 48 and is compressed between the forward section 48*b* of the plunger shoulder and an interior shoulder (not shown) which projects radially inwardly from the interior wall of intermediate section 38 of the pipet body. With such an arrangement the plunger return spring 50 always applies a rearward driving or restoring force which must be overcome to move the plunger in the opposite or forward direction by depressing actuator 14.

In pipets of the type described, movement of plunger 26 forward toward the open forward end 24 of the pipet tip 22 expels fluid, either liquid or air or both, from the tip while movement in the rearward direction away from the open end, draws fluid into the pipet tip through its open end. For a plunger normally biased toward a rearward stop position as described, fluid is picked up during rearward plunger movement of a first forward-rearward pickup stroke and then expelled during forward movement of the succeeding, second forward-rearward dispensing stroke. That is, in the course of the first stroke, plunger 26 is first moved toward a forward stop position to prepare the apparatus to take in fluid. Thereafter, with the open end 20 immersed in fluid, plunger 26 is allowed to move rearwardly under force of return spring 50 drawing fluid in thereby completing the first stroke. Thereafter, to initiate the second stroke, the plunger is again driven by actuator 14 forwardly to a forward stop position to expel fluid from the pipet. Finally, the plunger is again allowed to return to its rearward stop position to prepare the apparatus for the next pickup stroke.

Referring to FIG. 10, the upper or rearward end of plunger 26 coaxially receives a plunger follower 52 which is affixed to the plunger for axial movement therewith. Follower 52 includes a generally cylindrical cross piece 54 from which first and second legs 56 and 58 extending axially from opposite sides thereof. As illustrated most clearly in perspective view of FIG. 3, the outer surface of each follower leg 56 and 58 includes a respective radially projecting and axially extending projection 60 and 62. The projections are adapted to slidably reside within either a first pair of diametrically opposing recessed axially extending guideways 64 and 66 (FIG. 10, FIG. 8) in the interior wall of the rearward tubular section 36 of the pipet or within a second pair of such opposing guideways 68 and 70 (FIG. 8) circumferentially rotated from the first pair of guideways.

The cross piece 54 of plunger follower 52 is coaxially supported on plunger 26 in a fixed axial position thereon secured between actuator 14 and a radially projecting C-clip 72 which is snapped into annular groove 74 (FIG. 3) in the plunger. As illustrated in FIG. 10, follower cross piece 54 is axially constrained between radially projecting clip 72 and actuator 14 which together prevent relative axial movement between the plunger follower and the plunger. Rotation of the plunger follower about the plunger axis is precluded by the plunger follower leg projections 60-62 as received within guideway pairs 64, 66 or 68, 70.

A primary feature of the pipetting apparatus 10 is in an arrangement of elements which cooperate to establish different stroke lengths of plunger movement within the pipet and, moreover, which cooperate to establish or select a predetermined sequence of different stroke lengths enabling successive pickup and expulsion strokes to be of different lengths. To this end, the forward travel of the plunger 26 is blocked or stopped at two different axial positions to define the different plunger stroke lengths. For this purpose a stop member 76 (FIGS. 10, 3 and 5) is situated coaxially about plunger 26 in the path of travel of plunger follower 52. Before discussing in detail the stop member and its associated elements, an overview of the stroke length control by stop member 76 will be given with reference to the generalized perspective pictorial representations of FIGS. 17*a* and 17*b*. There, stop member 76 is diagrammatically illustrated in pertinent part as an annular element coaxially disposed in the path of forward movement of plunger follower 52. The stop member includes a first pair of stop surfaces 78, 80 at the bottom of diametrically opposing notches in one face 82 of the stop member. In the relative position shown in FIG. 17*a*, stop surfaces 78, 80 are engaged by the forward faces of plunger follower legs 56 and 58 to establish a first forward stop position of plunger travel. By rotating stop member 76 clockwise with respect to the plunger follower 52 to the position illustrated in FIG. 17*b*, the legs 56 and 58 of the plunger follower are then alinged to engage face 82 of the stop member in a second forward stop position with the face 82 defining the stop surface for both follower legs 56 and 58. It is thus seen that forward travel of plunger follower 52 and hence of plunger 26 is greater for the relative position shown in FIG. 17*a* than for that shown in FIG. 17*b*. In other words, forward plunger movement to the stop position of FIG. 17*a* establishes a relatively long plunger stroke of forward travel while forward plunger movement of to the position of FIG. 17*b* establishes a shorter plunger stroke. The difference in stroke length between the two strokes is the axial depth of notches 78, 80.

Stop member 76, as illustrated in greater detail in FIG. 5, includes a generally disc-shaped section 86 having an axially extending central bore 88 therethrough. The upper or rearwardly facing surface 82 of the disc defines the short stroke stop surface while long stroke stop surfaces are defined at the base of diametrically opposing notches 78, 80 extending into the disc from surface 82. A pair of diametrically opposing upright tabs 90 and 92 extend perpendicularly from the disc 86, the latter tab 92 having an integral axial extension 94 projecting therefrom. Three arcuate slots 96, 98 and 100 extend axially through stop member 76 at rotationally spaced locations around the stop member. A retaining slot 102 extends radially inward from one end of arcuate slot 98.

As illustrated in FIGS. 10–12 and 14, stop member 76 is disposed coaxially about support post 44 and plunger 26 within rearward tubular section 36 with stop surfaces facing rearwardly and tabs 90 and 92 extending rearwardly therein. Thus disposed, stop member 76 is arranged to rotate about the support post and hence about the plunger axis between a first location or rotational position (illustrated in FIGS. 10 and 17*a*), and a second rotational position illustrated in FIGS. 14 and 17*b*). In FIG. 10 the long stroke stop surfaces 78 and 80 are axially aligned with the forward ends of plunger follower legs 56 and 58 (the legs being illustrated in phantom outline) to define the forward limit of plunger travel for the long plunger stroke. In FIG. 14, by contrast, short stroke stop surface 82 is in rotational alignment with the plunger follower legs (again in phantom outline) to define the forward limit of plunger travel for the short plunger stroke.

In accordance with a primary aspect of the present invention before a pipetting operation, the location or rotational position of stop member 76 is preset by an arming operation to establish a predetermined sequence of two different stroke lengths, either long followed by short or vice versa. For this purpose, pipet 10 includes a drive spring 104 with integral spring legs or ends 108 and 110 (FIGS. 5 and 10) for driving the stop member in one direction between its two rotational positions, an arming element 106 for energizing the drive spring, a retaining arm 130 (FIGS. 11–12) for retaining the stop member in one location against action of the drive spring, and a release pawl 136 for disabling retaining action of arm 130 in response to plunger movement to allow the drive spring to drive the stop member between rotational positions. As illustrated in FIG. 10, arming element 106 and drive spring 104 are disposed, like stop member 76, coaxial with plunger 26 about support post 44. Arming element 106 is also rotatable about the pipet axis and, additionally, is disposed for relative rotation with respect to the stop member 76. To this end, referring to FIG. 5, arming element 106 comprises a generally cylindrical body 112 having a central axial bore 114 therethrough. Cylinder body 112 includes axially spaced circumferential projections 116 and 118, the former of larger diameter than the latter, between which a circumferential inwardly extending notch or recess 120 is defined. Diametrically opposed tabs 122 and 124 project radially outward from circumferential projection 116. Tab 124 is extended in the axial forward direction to function as an actuator for the arming element 106.

Stop member 76 and arming element 106 are assembled in a coaxial nested relationship about support post 44, as illustrated in FIGS. 4 and 10, and as thus nested are arranged for relative rotation with respect to each other about the pipet axis. Referring to FIG. 5, arming element actuator tab 124 is received within arcuate slot 96 of the stop member and the forward cylindrical section of body 112 of arming element 106 is received within bore 88 of the stop member 76 as illustrated in FIG. 10. Thus arranged, referring to FIG. 4, arming actuator tab 124 projects axially forward and extends through a slot 126 in annular wall 40 in the floor of rearward pipet body section 36 along the exterior of the intermediate pipet body section 38.

Figure 8:
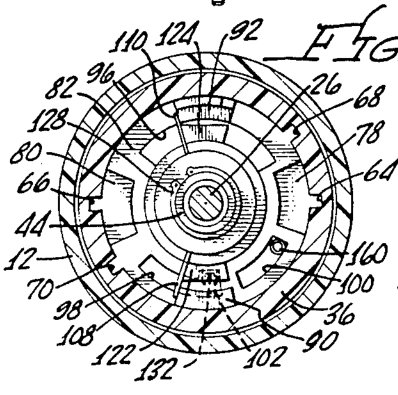
FIG. 8 is a cross-sectional view taken along line 8—8 in FIG. 6*a* illustrating the relative rotational positions of the cooperating arming element, drive spring, and stop member in the unarmed position.

Drive spring 104 couples stop member 76 and arming element 106 in their nested relationship. To this end, referring to FIG. 10, the coiled section of drive spring 104 resides within annular recess 120 of the arming element with spring legs or ends 108 and 110 projecting radially outward therefrom as illustrated in FIG. 8. As further illustrated in FIG. 8, the diametrically opposed tabs 90 and 92 of stop member 76 and tabs 122 and 124 of arming element 106 are rotationally aligned with one another. As illustrated in FIG. 8, drive spring leg 108 projects radially outward across an axial face of both tab 122 and tab 90 while the other drive spring leg 110 projects radially outward across an axial face of both tabs 124 and 92. With this arrangement relative rotation between the stop member 76 and the arming element 106 rotates one but not the other of the drive spring legs 108 and 110 thereby energizing the drive spring.

Figure 13:
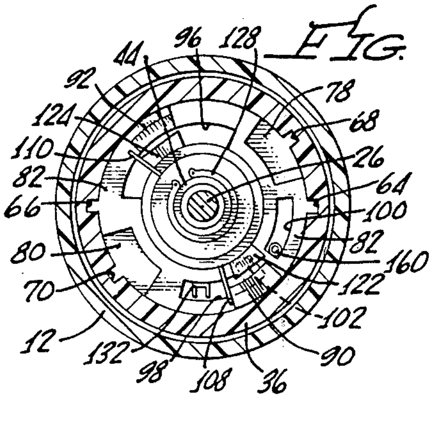
FIG. 13 is a cross-sectional view of the operating elements similar to FIGS. 8 and 9 but illustrating rotation of the stop member to its second location following the release action depicted in FIG. 12.

A locking clip 128 (FIG. 10) affixed to support post 44 retains arming element 106 and stop member 76 against axial movement along post 44 while permitting their rotational movement about the post and hence about the pipet axis. Further, retainer pin 160 (FIG. 8) secured in wall 40 of the pipet body extends rearwardly therefrom into recess 100 of stop member 76 in a position to stop clockwise rotation of the stop member (as viewed in FIG. 8) from the position illustrated in FIG. 8 but to allow counterclockwise rotation therefrom to the position illustrated in FIG. 13.

As described to this point, stop member 76 is disposed for rotation about the pipet axis to position either long stroke surfaces 78, 80 or short stroke stop surface 82 in axial alignment with legs 56, 58 of plunger follower 52. As will become apparent from the ensuing discussion, stop member 76 is adapted to be rotated by driving action of drive spring 104, and the drive spring, in turn, is adapted to be energized by the relative rotational movement of arming element 106 upon an operator's rotation of arming actuator 124.

Referring now to FIGS. 3–4, the rotational location of stop member 76 defining one of the two plunger stroke lengths is established by a retaining mechanism comprising a resilient retaining arm 130 supported on intermediate tubular section 38 of the pipet and terminating in a projecting finger 132 at the rearward end thereof. The retaining arm extends rearwardly along section 38 through a slot 134 in wall 40 with a projecting finger 132 received within radially extending retaining slot 102 of stop member 76. As illustrated, retaining arm 130 is pivotally supported at its forward end only by a pair of projections 135 protruding through mating openings 135*a* in the retaining arm. As thus disposed, the retaining arm is adapted to pivot or flex about its fixed lower end from the position illustrated in FIG. 11 outwardly to to the position illustrated in FIG. 12. In FIG. 12 the retaining arm has flexed or pivoted to the left about its lower end. In FIG. 11 projecting finger 132 is received within radially extending retaining slot 102 in stop member 76 and, in such position, retains the stop member in a first location and prevents rotation of the stop member. In the position shown in FIG. 12, the projecting finger is pivoted out of the retaining slot 102 into the arcuate slot 98 (see FIG. 5) in which position it allows rotation of the stop member to a second location with relative movement of the projecting finger accommodated along and within arcuate slot 98.

Significantly, the retaining arm 130 retains the stop member in its first location against the force of drive spring 104 but upon being released allows the drive spring to drive or rotate the stop member to its second location.

Release of the retaining arm 130 and hence of the stop member 76 is controlled by cooperation of a release pawl 136 supported on the retaining arm and the spool-shaped plunger shoulder 48 which engages the pawl during plunger movement forward and rearward. To this end, referring to FIG. 3, the pawl 136 and a cooperating pawl spring 138 are pivotally supported on a pin 140 supported on the retaining arm 130. As supported, release pawl 136 extends through an opening 141 (FIGS. 3, 11–12) in the intermediate pipet section 38 body into the path of movement of plunger shoulder 48. Pawl spring 138 biases the pawl in a counterclockwise direction toward the pawl position illustrated in solid outline in FIG. 11. As thus situated, the pawl is adapted to rotate clockwise about pin 140 against the force of pawl spring 138 in the direction of the arrow in FIG. 11 to the position illustrated in phantom outline in the figure. As further illustrated in FIG. 11, pawl 136 includes a rearwardly facing surface 142 extending into the plunger path at right angles to the pipet axis and a beveled surface 144 at about a 45° angle to the pipet axis and facing toward the forward end of the pipet. With such an arrangement, when the plunger is driven forwardly by actuator 14, leading a forward face of section 48*a* of plunger shoulder 48 strikes the rearward facing surface 142 of the release pawl and rotates the pawl clockwise to the position illustrated in phantom outline in FIG. 11. When the plunger shoulder has passed by the release pawl, the pawl is rotated by pawl spring 138 back to the solid outline position of FIG. 11, and the plunger continues forward movement until the corresponding stop position is reached. Thereafter, as plunger return spring 50 is allowed to drive the plunger rearwardly, the rearward face of section 48*a* of the plunger shoulder engages beveled surface 144 of the release pawl. With continued rearward motion of the plunger, the shoulder section 48*a* cams the release pawl and the retaining arm 130 outwardly (to the left in FIG. 12) to the position illustrated in FIG. 12 in which position projecting finger 132 of the retaining arm has been moved out of the retaining slot 102 of stop member 76 thereby leaving the stop member free to rotate.

Before describing the operation of a complete short-long or long-short plunger stroke sequence, one preferred arming arrangement for energizing the drive spring 104 will be described. As indicated previously, the drive spring 104 is energized by effecting relative rotation between arming element 106 and stop member 76. This is achieved, for example, by rotating arming actuator 124 in one direction (counterclockwise in the Figs.) while retaining the stop member stationary by means of retaining arm finger 132 situated in retaining slot 102. In one preferred form arming actuator 124 is rotatably driven by arming sleeve 30. For this purpose actuator 124 is received within a mating axially extending interior slot or recess 146 (FIGS. 2, 4 and 7) along the interior wall of arming sleeve 30 such that rotation of the arming sleeve causes corresponding rotation of the arming actuator to energize drive spring 104. Significantly, in one embodiment, such arming rotational action of arming sleeve 30 is effected by the operator's act of installing disposable tip 22 on the pipet 10.

To the foregoing ends, referring now to FIGS. 2, 6*a*–6*b* and 7, arming sleeve 30 is generally tubular in configuration and is received coaxially around the intermediate pipet body 38. The rearward interior wall of the arming sleeve includes the axial recess 146 which receives arming actuator 124 of arming element 106. A guide slot 148 is formed in the wall of the arming sleeve and receives a mating guide projection 150 extending outwardly from pipet body section 38. Guide slot 148 extends partially axially along and circumferentially around the arming sleeve in such a manner as to cooperate with guide projection 150 to constrain the arming sleeve for simultaneous axial and rotational motion along and around the intermediate pipet body 34.

Figure 6A:
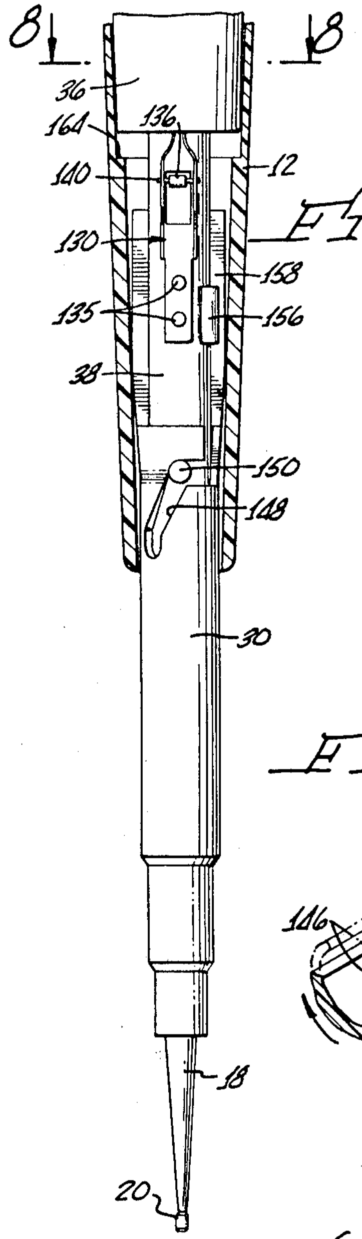
FIG. 6*a* is a partial side elevational and sectional view of the pipet depicting the arming sleeve of the pipet in the forward, unarmed position.

Arming sleeve return spring 152 (FIG. 2) is received coaxially within the arming sleeve and normally serves to bias the arming sleeve forwardly to the unarmed position illustrated in FIG. 6*a*. To this end, the rearward end of return spring 152 engages shoulder 154 (FIG. 2) of nozzle 18 and the forward end of the return spring engages an interior shoulder (not shown) of the arming sleeve. Arming sleeve 30 is stopped in the unarmed position of FIG. 6*a* by rotational stop 156 (FIG. 4, FIG. 6*a*). The stop 156 protrudes from intermediate pipet body 38 and engages axial wall 158 of the arming sleeve to prevent further rotation and axial forward movement of the arming sleeve.

In the unarmed position of FIG. 6*a*, the forward end of arming sleeve 30 extends over and beyond a portion of nozzle 18 around which disposable tip 22 is to be seated. As a result, as the operator inserts the disposable tip over and along nozzle 18, the tip engages the forward end of arming sleeve 30 and drives the arming sleeve rearwardly along the pipet against the forward driving force of arming sleeve return spring 152. As the arming sleeve is rearwardly driven, the guide slot 148 and guide pin 150 cooperate to cause corresponding rotational movement of the arming sleeve toward the armed position of FIG. 6b. Since arming actuator 124 of arming element 106 is received within recess 146 of the arming sleeve, the arming actuator is rotated with and by the arming sleeve and hence energizes drive spring 104 in the manner described previously.

The operator installs disposable tip 22 on nozzle 18 with sufficient force to wedge the open tip 20 of the nozzle into an air-tight sealed peripheral relationship with the interior wall of the tip 22. Proper installation of the tip requires such a tight seal in order that plunger movement will draw fluid into and out of only the open end 24 of the disposable tip. Significantly, arming sleeve return spring 152 applies a sufficient axial force to the arming sleeve 30, and hence to disposable tip 22 engaged thereby, to dislodge and expel tip 22 from the nozzle 18 unless the tip is securely and properly seated on the nozzle. In other words, a properly seated tip 22 holds the arming sleeve 30 in the armed position shown in FIG. 6b, i.e. with the pipet armed and the drive spring 104 energized. Unless the tip is so seated, the arming sleeve return spring 152 will drive the arming sleeve forwardly to the position of FIG. 6a thereby dislodging the tip and leaving the pipet in an unarmed condition. This is a fail-safe arrangement informing an operator that if the tip is properly installed, the pipet is armed to executed the predetermined plunger stroke sequence.

Operation of pipet 10 to execute the predetermined short-long or long-short sequence of plunger movement is as follows. Initially assume that the pipet is in the unarmed position depicted in FIGS. 6a and 8. Assume further that projections 60 and 62 on plunger follower legs 56 and 58 are aligned for axial movement in guideways 64 and 66 (FIG. 8). Thus arranged, long stroke stop surfaces 78 and 80 of stop member 76 are initially rotationally aligned axially with plunger follower legs 56 and 58 to define the forward or long stroke limit position of plunger travel.

With the pipet in the unarmed condition, the pipet will only execute the longer plunger stroke, and plunger 26 can be repeatedly driven forward and rearward to execute any number of such long plunger strokes.

Figure 6B:
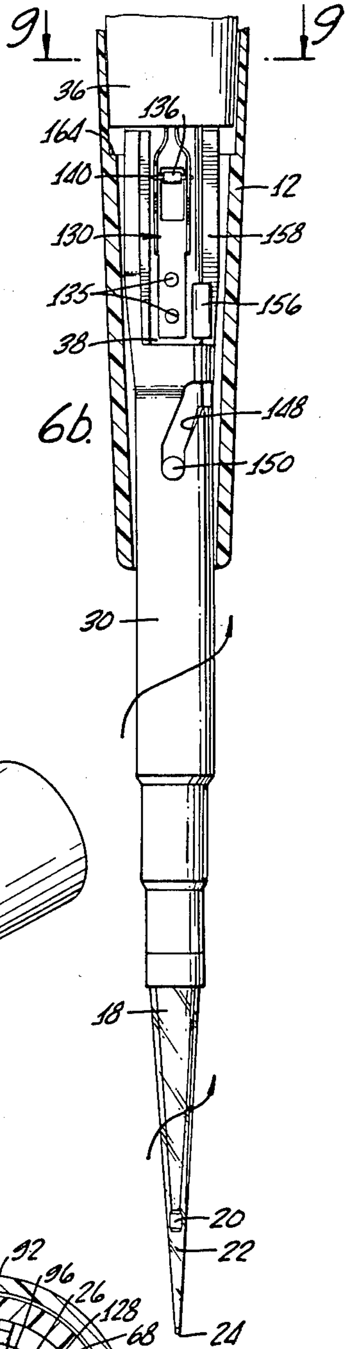
FIG. 6*b* is a view identical to FIG. 6*a* but illustrating the arming sleeve driven into the rearward circumferentially rotated armed position by the installation of a disposable tip on the open end of the pipet body.
Figure 7:
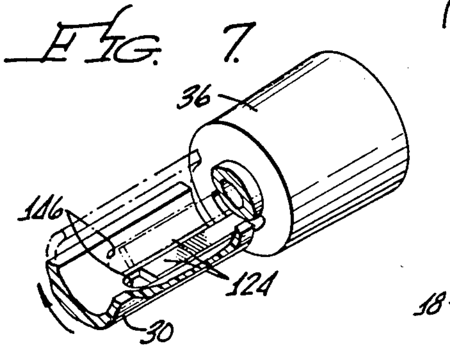
FIG. 7 is a partial cross-sectional, partial perspective fragmentary view looking rearwardly from the open end of the pipet illustrating the cooperating fit of the arming sleeve with the arming element actuator and, in phantom outline, the armed position of the arming element after being rotated by the arming sleeve.
Figure 9:
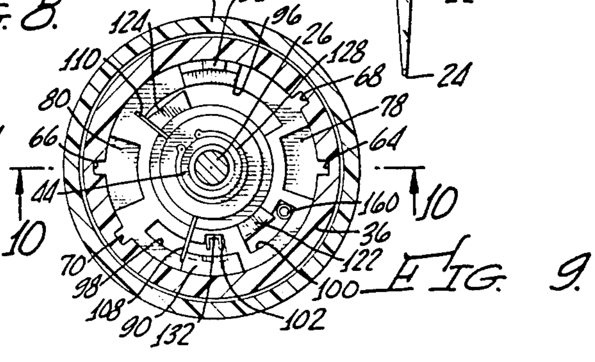
FIG. 9 is a view like FIG. 8 but taken along line 9—9 of FIG. 6*b* depicting the same cooperating elements in the armed position.

To arm pipet 10 an operator installs tip 22 on the end of the pipet causing the tip to drive the arming sleeve 30 rearwardly to the rotated, armed position illustrated in FIG. 6b (causing corresponding rotation of the arming actuator 124 to the armed position illustrated in phantom outline in FIG. 7 and in solid outline in the cross section of FIG. 9). As illustrated in FIG. 9, rotation of arming actuator 24 rotates drive spring leg 110 counterclockwise in the figure. Opposing mating tab 122 on arming element 106 rotates counterclockwise away from the second leg 108 of the drive spring. However, second drive spring leg 108 is retained in its original position against the tab 90 of stop member 26 as illustrated in FIG. 9. Rotating one drive spring leg counterclockwise while retaining the other leg stationary the drive spring 104. As a result, with spring 104 energized, leg 110 applies a clockwise rotational force to actuator 124 of arming element 106 while leg 108 applies a counterclockwise rotational force to tab 90 of stop member 76. Arming element 106 is prevented from rotating since arming sleeve 30, as held in position by disposable tip 22, retains arming actuator 124 in a fixed rotational orientation. Similarly, counterclockwise rotation of stop member 76 is prevented by projecting finger 132 situated in radial slot 102 of the stop member as illustrated in FIG. 9.

With the pipet armed as described, an operator is ready to execute the first or fluid pickup plunger stroke. To this end the operator depresses actuator 14 to drive plunger 26 forward toward the open end of the pipet. At the beginning of such forward movement, plunger 26 is in the position illustrated in FIG. 11 with rearward section 48a of plunger shoulder 48 disposed axially rearward of release pawl 136. As the plunger is driven forwardly, the plunger projection piece 48a rotates the release pawl clockwise as illustrated in phantom outline in FIG. 11. After the plunger projection 48a has passed completely by the release pawl 136 on its way to the forward stop position, the pawl is rotated counterclockwise by pawl spring 138 back into the path of plunger projection piece 48.

At the forward limit of plunger travel, illustrated in phantom outline in FIG. 10, plunger follower legs 56 and 58 strike corresponding long stroke stop surfaces 78 and 80 to arrest movement of the plunger in such position. In the course of such forward movement, plunger 26 expels a predetermined volume of air from the open end 24 of tip 22.

At the conclusion of forward movement, the operator immerses tip opening 24 in a fluid to be picked up and releases actuator 14 allowing plunger return spring 50 to drive the plunger rearwardly toward the rearward stop position. In the course of such rearward movement, the rearward face of plunger shoulder section 48a engages beveled surface 144 of release pawl 136. Continued rearward movement of the plunger cams the release pawl and retaining arm 130 outwardly (to the left) as illustrated in FIG. 12. Pivoting retaining arm 130 and integral projecting finger 132 in such a manner moves finger 132 radially out of slot 102 of stop member 76 and into adjacent arcuate slot 98. With finger 132 removed from slot 102, stop member 76 is released from the retaining action of the finger and is free to rotate counterclockwise under the driving action of drive spring leg 108 bearing against upright tab 90 of the stop member. Such rotation takes place immediately causing the stop member to be rotated counterclockwise to the position illustrated in FIG. 13 in which short stroke stop surface 82 is now rotated into axial alignment with the stop surfaces of legs 56 and 58 of plunger follower 52. Plunger 26 continues its rearward movement until it reaches its rearward limit position with plunger shoulder section 48a engaging stop 46 in the position illustrated in FIG. 10. Such rearward plunger movement as described causes a predetermined volume of fluid to be drawn into tip 22 through opening 24 therein.

At the end of the preceding pickup operation, the second pair of stop surfaces 82 have been rotated into position so that the succeeding forward plunger movement to dispense fluid from the tip will be a different distance, herein shorter, than the initial pickup stroke. To this end the operator positions the pipet tip over a dispensing vessel and actuates plunger 14 to drive the plunger forwardly until the follower legs 56 and 58 strike the short stroke stop surface 82 as illustrated in phantom outline FIG. 14. Such causes a predetermined volume of fluid to be dispensed from tip 22 less than the total volume of fluid initially picked up in the tip.

The pipetting cycle is completed by allowing plunger return spring 50 to drive the plunger rearward to its limit position.

Thereafter the operator removes and discards tip 22. Removal of the tip allows the arming sleeve return spring 152 to drive the arming sleeve 30 forwardly from the position illustrated in FIG. 6b to the unarmed position of FIG. 6a. Such causes simultaneous rotation of the arming sleeve, and hence simultaneous rotation of arming actuator 124 secured thereto, from the position of FIG. 13 clockwise to the initial position of FIG. 8. With arming actuator 124 thus rotated clockwise to the FIG. 8 position, opposing tab 122 on the arming element engages and drives the spring leg 108 clockwise. Such movement of the spring leg 108 causes, in turn, opposing drive spring leg 110 to engage upright tab 92 of stop member 76 and rotate the stop member clockwise. The result is that all elements are returned to the initial position shown in FIG. 8. At that time projecting finger 132 of resilient retaining arm 130 pivots by resilient snap-action of the retaining arm radially inward back into retaining slot 102 to retain the stop member against rotational movement during the next arming operation.

The foregoing described operation executed a sequence of plunger movement comprising a long pickup stroke followed by a short dispense stroke as would be employed to dispense a smaller fluid volume than that picked up. Pipet 10 is equally adapted to execute an opposite stroke sequence of a short stroke followed by a long stroke. For such purposes, projections 60 and 62 of plunger follower legs 56 and 58 are initially assembled in opposing guideways 68 and 70 in the interior wall of pipet section 36. Operation is then in a manner identical to that described previously except that, because of the now different orientation in guideways 68 and 70, the stop surfaces of plunger follower legs 56 and 58 initially are axially aligned with short stroke stop surface 82 of stop member 76 causing the first forward plunger movement or pickup stroke to terminate at the short stroke limit position. Thereafter, operation of the stroke length control elements rotates the stop member counterclockwise as previously described. Such counterclockwise motion causes the long stroke stop surfaces 78 and 80 to be rotated into axial alignment with the plunger follower legs. Thereafter, the next forward plunger movement or dispensing stroke terminates at the long stroke position causing all of the fluid picked up to be discharged from tip 22 followed by a slug or volume of air.

As noted above, a predetermined one of the different stroke length sequences, i.e. either short followed by long or long followed by short, is established by the original assembly of plunger follower leg projections 60 and 62 in either guideway pair 64, 66 or 68, 70. In effect the guideway pair selected selects the initial relative rotational orientation of plunger follower 52 and stop member 76 to define the length of the first plunger stroke. Thus, with the plunger follower rotationally aligned in one guideway pair, arming action always establishes a single one of the two predetermined stroke sequences. To implement the second stroke sequence the initial relative rotational orientation is changed by removing follower 52 from the rear pipet section 36 and from one pair of guideway pairs therein and then reassembling the follower by reinserting it into the other pair of guideways. Thereafter, with the follower in the second guideway pair, the pipet will execute the second of the two stroke sequences.

In the unarmed position of FIGS. 6a and 8, repeated actuation of actuator 14 causes plunger 26 to execute successive strokes of the same first length, either long or short depending upon the rotational orientation of follower leg projections 60, 62 in guideway pair 64, 66 or 68, 70. In the armed position of FIGS. 6b and 9, the stop member 76 is in the same position as in the unarmed FIG. 8 position, and hence the first stroke after arming (i.e. the pickup stroke) is the same first length as when unarmed. Rearward plunger movement during this first pickup stroke rotates stop member 76 to the second location of FIG. 13. As a result the succeeding discharge stroke is of the second stroke length. Further actuation of the plunger executes further strokes of the second stroke length as long as arming element 106 is held by arming sleeve 30 in the counterclockwise rotated position of FIGS. 6b and 13. Thereafter, when tip 22 is removed from the pipet, the elements are rotated back to the FIG. 8 position so that all further strokes pending rearming will be the first stroke length.

In accordance with a further feature of the pipet 10, the initial relative rotational orientation of plunger follower 52 and stop member 76 is readily selectable. For example, a two-position switch actuator or similar device, preferably operator controlled, is included to rotate one of plunger follower 52 and stop member 76 with respect to the other between the two plunger follower rotational orientations corresponding to those defined by the two guideway pairs 64, 66 and 68, 70. More particularly, in one form, the tubular wall of rearward body 36 includes only a single pair of axially extending guideways for receiving the plunger, and the tubular wall is further rotatable about the pipet axis to rotate the plunger follower therewith between first and second rotational positions with respect to the stop member defining, respectively, long and short first plunger strokes. The tubular wall is retained in the first or second position by a suitable operator controlled fastener or keeper (not shown) or by a comparable pair of detents at the respective rotational positions until it is desired to rotate it to the other position. In such a manner, an operator selects either of the two long-short or short-long stroke sequences and switches from one to the other witout having to remove and reassemble the plunger follower as previously described.

In a simpler form of the pipet 10 arming of the pipet is effected independently of the act of installing tip 22 on the pipet. In this form an operator rotates the arming sleeve 30 or rotates the arming element 124 directly to the armed position of FIG. 9. To this end the arming sleeve may be shortened at its forward end, if desired, or may be eliminated entirely exposing arming element 124 (FIG. 4) for operator thumb or finger rotational actuation. In such case a suitable fastener or keeper (not shown) or comparable detent arrangement is provided to retain arming element 124 in the armed position of FIG. 9 until pickup and dispensing strokes have been executed. After the dispensing stroke, the operator releases the fastener and rotates the arming element back to the FIG. 8 position pending a subsequent arming operation.

The described pipet arrangement eliminates operator uncertainty as to the first stroke the pipet will execute. Arming the pipet ensures the first stroke will be the requisite stroke length and will be followed by the second stroke of different length. Moreover, the stroke length control elements operate in response to the relatively small force of the drive spring 104. This eliminates undesired axial force loading of the stroke length control elements by the plunger itself and hence reduces the degree of wear and the likelihood of premature part failure caused by such loading. Moreover, the likelihood of the stroke length control elements jamming or otherwise malfunctioning from operator misuse or abuse is substantially reduced.

While the stop member 76 and cooperating elements are positioned to stop forward plunger movement at two axial positions with a fixed stop position for rearward movement, the parts could be reversed to position the stop member 76 in the path of rearward plunger movement to stop such rearward movement at two axial positions with a fixed stop position for forward plunger movement.

referring now to FIGS. 10, 11 and 14–16, pipet 10 further incorporates a signalling system for monitoring movement of plunger 26 and for signalling the dispensing of fluid by the pipet. As illustrated, the system is situated within rearward head 16 of the pipet body and, in one preferred form, includes an arrangement of optical elements for optically monitoring plunger position. To this end, as illustrated in FIG. 15, optical passageways 170 and 172 extend through the walls of head 16 and rearward pipet body section 36 in directions generally normal to the pipet axes but non-radial with respect thereto. A light source 174 in passageway 170 directs light along an optical axis 176 toward the circumferential surface of plunger follower cross piece 54 and a light detector 178 in passageway 172 intercepts light reflected from the surface of the plunger follower and directed thereto along an optical axis 180. As illustrated in FIGS. 10–11, optical passageways 170 and 172 are situated axially forward from the rear stop position of the plunger follower 52. As a result plunger follower 52 in its rearwardmost position is rearwardly displaced from and hence does not intersect the optical axes 176 and 180 extending therein. Consequently, the plunger follower is only in position to intercept the optical axes upon forward movement of the follower to the axial position illustrated in solid outline in FIG. 16.

When the plunger follower intersects optical axes 176 and 180 in the forward axial position, light received from source 174 is reflected or redirected by the circumferential plunger surface to detector 178, and the detector generates an output signal in response thereto indicating that the plunger has been driven to the forward axial position.

Plunger follower 52 will be in position to intercept optical axes 176 and 180, and hence to induce the output signal, twice during a normal pipeting cycle—once during the pickup stroke and once during the dispense stroke. In order to derive a signal clearly indicative of a dispense stroke of the pipet, an arrangement is provided to disable the signalling system during the pickup stroke. To this end extension 94 (FIG. 5) of stop member 76 extends rearwardly along the interior wall of pipet body section 36 to an initial circumferential position illustrated in FIGS. 10 and 15 blocking optical passageway 170 and thus preventing transmission of light along optical axis 176 therethrough. Consequently, after the pipet is armed as aforedescribed and as actuator 14 is depressed to initiate a pickup stroke, the optical signalling system is disabled by the blocking action stop member extension 94 which prevents light from reaching detector 174. With the optical path thus blocked, the plunger follower does not intercept and redirect light toward detector 178 during forward plunger movement. As a result, the optical system effectively disabled by extension 94 to the extent that it does not "see" or respond to the forward plunger movement during the pickup stroke. During plunger return to the rearward stop position, plunger shoulder 48 engages release pawl 136 causing pivoting of projecting finger 132, allowing drive spring 104 to rotate the stop member 76 as aforedescribed to its second position to establish stop surfaces for the dispensing stroke to follow. Significantly, integral extension 94 of the stop member is also rotated therewith away from passage 170 to the circumferential position (illustrated in FIG. 14 and in phantom outline in FIG. 15) which does not block the optical path. Such unblocking occurs after plunger follower 52 has retracted rearwardly beyond optical axes 176 and 180. Thereafter, during the succeeding dispensing stroke, as the plunger is driven forwardly to dispense fluid from tip 22, plunger follower 52 will again intercept optical axes 176 and 180 therey causing light received from source 174 to be reflected and redirected from the plunger follower surface to detector 178 which generates an output signal indicating that the dispense operation has occurred.

The cycle is completed when the plunger is returned to its rearward limit position. Thereafter, removal of tip 22 causes clockwise rotation of the stop member 76 as previously described thereby repositioning extension 94 in the blocking position in front of passage 170 as illustrated in FIGS. 10 and 15.

While the signalling system has been illustrated employing optical elements with stop member extension 94 movable between first and second locations to disable the system in one position but enable it in the other, the same movement of extension 94 may be employed to enable and disable other types of signalling systems. For example, motion of extension 94 after the first plunger stroke can be employed to enable electrical, magnetic, or other types of switching systems which would then be actuated only during the next forward movement of the plunger.

Moreover, while stop member extension 94 is movable with movement of stop member 76 as the stop member establishes two stroke lengths of plunger movement, the signalling system is equally adapted for pipets which execute successive strokes of the same length. In such case only one stop surface is provided on stop member 76, or is provided on a stop element independent of member 76. Stop member 76, whether performing the plunger stop function or not, nevertheless controls movement of extension 94 as aforedescribed to effect signalling by detector 178 upon execution of the fluid dispensing stroke.

In the optical signalling arrangement a high signal to background ratio is maintained by orienting optical axes 176 and 180 non-radially with respect to plunger 26 as illustrated in FIG. 15. This minimizes the likelihood of light being reflected from the surface of the plunger toward the detector. In addition to establishing a high signal-to-background level, such an arrangement minimizes light reflections which could generate a false signal of forward plunger dispensing.

Moreover, while several preferred embodiments of the invention have been illustrated and described, it will be apparent that modifications may be made therein without departing from the invention as defined by the appended claims.

What is claimed is:

1. Pipetting apparatus comprising:

a generally tubular body having an open forward end for receiving and expelling fluid and adapted to receive a replaceable open tip thereon;

a plunger supported for axial movement in the body to draw fluid into and expel fluid from the open tip on the body with axial movement away from and toward the open end;

stop means movable between first and second locations in the body to halt movement of the plunger in one direction at first and second axial positions thereby establishing different stroke lengths of plunger movement in the body;

spring means for driving the stop means in one direction between the first and second locations;

arming means for energizing the spring means in response to the positioning of the replaceable tip on the body;

means for retaining the stop means in one of the first and second locations against action of the spring means; and release means responsive to plunger movement away from the forward end during a first plunger stroke following energizing of the spring means for disabling the retaining means and allowing the spring means to drive the stop means to the other of the first and second locations whereby the first plunger stroke and the succeeding plunger stroke are of the different stroke lengths.

2. The apparatus of claim 1 wherein the arming means further includes an arming element movable between unarmed and armed positions and return spring means biasing the arming element toward the unarmed position in which position the arming element obstructs positioning of the tip on the body; and wherein the tip, during installation thereof, engages and drives the arming element toward the armed position thereof against the return force of the return spring means engaging the arming element, the return spring force being applied by the arming element to the tip in a direction to expel the tip from the body and being of sufficient strength to so expel the tip unless the tip is properly seated and secured on the body, thereby allowing the arming means to energize the driving spring means only if the tip is properly installed.

* * * * *